United States Patent [19]

Stanley et al.

[11] Patent Number: 5,021,507
[45] Date of Patent: Jun. 4, 1991

[54] ARCYLIC MODIFIED REACTIVE URETHANE HOT MELT ADHESIVE COMPOSITIONS

[75] Inventors: Henry Stanley, Cedar Grove; Irwin Davis; Wen B. Chiao, both of Bridgewater, all of N.J.

[73] Assignee: National Starch and Chemical Investment Holding Corporation, Wilmington, Del.

[21] Appl. No.: 200,092

[22] Filed: May 27, 1988

Related U.S. Application Data

[63] Continuation-in-part of Ser. No. 43,140, Apr. 30, 1987, abandoned, which is a continuation-in-part of Ser. No. 859,539, May 5, 1986, abandoned.

[51] Int. Cl.$^5$ .................... C08F 8/30; C08L 75/04
[52] U.S. Cl. ................... 525/127; 525/130; 521/159
[58] Field of Search ............. 525/127, 130; 521/159; 528/50, 75

[56] References Cited

U.S. PATENT DOCUMENTS

| | | | |
|---|---|---|---|
| 3,304,273 | 2/1967 | Stamberger | 260/2.5 |
| 3,383,351 | 5/1968 | Stamberger | 260/33.2 |
| 3,408,420 | 10/1968 | Wiggill | 260/827 |
| 3,425,964 | 2/1969 | Stanley | 260/2.5 |
| 3,617,362 | 11/1971 | Bemmels et al. | 117/122 |
| 3,644,245 | 2/1972 | Flanagan | 260/23 |
| 3,644,569 | 2/1972 | Pietsch et al. | 260/835 |
| 3,652,639 | 3/1972 | Pizzimi et al. | 260/465.4 |
| 3,706,697 | 12/1972 | Backderf | 260/29.2 |
| 3,707,518 | 12/1972 | Bemmels et al. | 260/29.6 |
| 3,729,438 | 4/1973 | Plesich et al. | 260/29.6 |
| 3,776,977 | 12/1973 | Chadba | 260/825 |
| 3,823,201 | 7/1974 | Pizzimi et al. | 260/861 |
| 3,838,093 | 9/1974 | Owston | 260/33.8 |
| 3,931,077 | 1/1976 | Uchigaki et al. | 260/26 |
| 3,968,089 | 7/1976 | Cuscurida et al. | 260/859 |
| 3,970,715 | 7/1976 | Jarrett | 260/859 |
| 4,059,466 | 11/1977 | Scholl et al. | 156/78 |
| 4,059,714 | 11/1977 | Scholl et al. | 428/310 |
| 4,061,618 | 12/1977 | Stanley et al. | 260/29.2 |
| 4,112,213 | 9/1978 | Waldman | 526/279 |
| 4,125,487 | 11/1978 | Olstowski | 521/137 |
| 4,146,585 | 3/1979 | Ward et al. | 260/827 |
| 4,153,643 | 5/1979 | Preston et al. | 260/861 |
| 4,156,754 | 5/1979 | Cobbs et al. | 428/310 |
| 4,200,207 | 4/1980 | Akers et al. | |
| 4,214,061 | 7/1980 | Lee | 525/455 |
| 4,217,254 | 8/1980 | Legne | 260/3.3 |
| 4,219,632 | 8/1980 | Simms | 526/218 |
| 4,242,415 | 12/1980 | Feltzin et al. | 428/412 |
| 4,242,488 | 12/1980 | Stanley et al. | 428/423.1 |
| 4,258,140 | 3/1981 | Horacek et al. | 521/114 |
| 4,259,402 | 3/1981 | Cobbs et al. | 428/310 |
| 4,264,214 | 4/1981 | Akers et al. | |
| 4,284,572 | 8/1981 | Stanley et al. | 260/347.4 |
| 4,291,136 | 9/1981 | Keogh | 525/102 |
| 4,333,867 | 6/1982 | Sauntson | 524/547 |
| 4,343,917 | 8/1982 | Keogh | 525/106 |
| 4,352,858 | 10/1982 | Stanley | 428/423.1 |
| 4,371,096 | 2/1983 | Frates et al. | |
| 4,405,063 | 9/1983 | Coker et al. | |
| 4,419,476 | 12/1983 | Coughlin et al. | 524/284 |
| 4,425,468 | 1/1984 | Makhlouf et al. | 524/710 |
| 4,434,272 | 2/1984 | Keogh | 525/100 |
| 4,486,508 | 12/1984 | Coughlin et al. | 428/480 |
| 4,535,919 | 8/1985 | Jameson | |
| 4,537,934 | 8/1985 | Fock et al. | 525/123 |
| 4,581,392 | 4/1986 | Armstrong et al. | 523/209 |
| 4,591,607 | 5/1986 | Campbell et al. | 521/137 |
| 4,601,427 | 7/1986 | Farmer et al. | |
| 4,679,710 | 7/1987 | Jameson et al. | |
| 4,695,596 | 9/1987 | Berkowitz | 521/137 |
| 4,716,194 | 12/1987 | Walker et al. | 524/806 |
| 4,775,719 | 10/1988 | Markevka et al. | 525/125 |
| 4,808,255 | 2/1989 | Markevka et al. | 156/307.3 |

FOREIGN PATENT DOCUMENTS

| | | |
|---|---|---|
| 421697 | 2/1972 | Australia . |
| 428675 | 9/1972 | Australia . |
| 471844 | 4/1976 | Australia . |
| 491412 | 3/1978 | Australia . |
| 503537 | 8/1979 | Australia . |
| 6767981 | 2/1981 | Australia . |
| 7843781 | 12/1981 | Australia . |
| 1205246 | 5/1986 | Canada . |
| 0118171 | 9/1984 | European Pat. Off. . |
| 0232055 | 8/1987 | European Pat. Off. . |
| 0244608 | 11/1987 | European Pat. Off. . |
| 3236313 | 4/1984 | Fed. Rep. of Germany . |
| 1536758 | 8/1968 | France . |
| 2299350 | 1/1976 | France . |
| 50-43138 | 4/1975 | Japan . |
| 50-122534 | 9/1975 | Japan . |
| 52-123436 | 10/1977 | Japan . |
| 54-97634 | 8/1979 | Japan . |
| 59-45382 | 3/1984 | Japan . |
| 59-47247 | 3/1984 | Japan . |
| 59-232110 | 12/1984 | Japan . |
| 60-20906 | 2/1985 | Japan . |
| 60-44549 | 3/1985 | Japan . |
| 60-231722 | 11/1985 | Japan . |
| 1223688 | 3/1971 | United Kingdom . |
| 2137638 | 10/1984 | United Kingdom . |

OTHER PUBLICATIONS

Billmeyer, Fred W.; Textbook of Polymer Science, John Wiley & Sons, 1984, pp. 25-28.
"New Products Happen with Hypol Polymers", W. R. Grace & Co., 1986.

Primary Examiner—John Kight, III
Assistant Examiner—Dennis R. Daley
Attorney, Agent, or Firm—Ellen T. Dec

[57] ABSTRACT

The addition to urethane prepolymers of low molecular weight polymers formed from ethylenically unsaturated monomers which do not contain active hydrogen provides a hot melt adhesive which can be readily coated at a viscosity of 3000 to 50,000 cps. at 120°C. without the need for additional tackifiers or plasticizers and which has improved initial cohesive strength as well as improved strength after aging of the cured bond. In a preferred embodiment of the invention, the ethylenically unsaturated monomers are polymerized in the non-isocyanate containing components of the isocyanate terminated prepolymer.

28 Claims, No Drawings

ACRYLIC MODIFIED REACTIVE URETHANE HOT MELT ADHESIVE COMPOSITIONS

BACKGROUND OF THE INVENTION

This application is a continuation-in-part of copending application Ser. No. 043,140, filed Apr. 30, 1987, now abandoned, which is a continuation-in-part of application Ser. No. 859,539, filed May 5, 1986, now abandoned.

The present invention is directed to low viscosity reactive urethane hot melt adhesive compositions which are improved with respect to their cohesive and adhesive strength by the addition thereto of low molecular weight acrylic resins. In accordance with one embodiment of the invention, the acrylic monomer(s) is polymerized in the non-isocyanate component of the polyurethane prepolymer and the latter then reacted with suitable isocyanate functionalities to form a hot melt adhesive composition having a suitable coating viscosity without the necessity for addition of plasticizers or tackifiers.

Hot melt adhesives are 100% solid materials which do not contain or require any solvents. They are solid materials at room temperature but, on application of heat, melt to a liquid or fluid state in which form they are applied to a substrate. On cooling, the adhesive regains its solid form and gains its cohesive strength. In this regard, hot melt adhesives differ from other types of adhesives which achieve the solid state through evaporation or removal of solvents or by polymerization.

In order to obtain the required physical properties, most hot melt adhesives are formulated from thermoplastic materials which are applied molten at elevated temperatures and bond rapidly on cooling. Unfortunately, their thermoplastic nature also results in a bond which is heat sensitive and which may fail when the bond is subjected to even moderate heat.

Hot melt adhesive compositions which are applied in molten form, cool to solidify and subsequently cure by a chemical crosslinking reaction have been prepared using specific thermosetting materials such as polyurethanes. These hot melts exhibit superior heat resistance but have little inherent strength and resemble a heavy balsam or grease prior to undergoing cross-linking. In addition, these polyurethane based hot melt adhesives lack adequate adhesion to many commercial substrates such as polyvinyl chloride film, mylar and aluminum. Attempts have been made to improve the initial adhesive strength of polyurethane hot melts by the addition of certain thermoplastic resins as taught, for example, in U.S. Pat. No. 3,931,077 issued Jan. 6, 1976 to Uchigaki et al. These thermoplastic resins are, however, generally high molecular weight (i.e., greater than about 100,000) materials, so their addition appreciably raises the coating viscosity of the adhesive, requiring the further addition of plasticizers or tackifiers, in order to sufficiently reduce the viscosity so as to facilitate its application. While lowering the hot viscosity of the formulated adhesive, the addition of these plasticizing and tackifying components, in the relatively large amounts required, has a detrimental effect upon the adhesive properties of the polyurethane hot melt, particularly performance at higher temperatures, and after aging of the bond.

It is therefore an object of the present invention to provide an improved polyurethane hot melt adhesive composition characterized by superior initial adhesion to an unusually broad range of substrates as well as heat resistance even after aging of the bonds.

SUMMARY OF THE INVENTION

We have found that the addition of urethane prepolymers to low molecular weight polymers formed from ethylenically unsaturated monomers which do not contain active hydrogen, provides hot melt adhesives and gasketing compositions which are solid at room temperature and which can be readily coated at a viscosity of 3000 to 50,000 cps. at 120° C. without the need for additional tackifiers or plasticizers and which have improved initial cohesive strength, as well as improved strength after aging of the cured bond. Moreover, the adhesives exhibit these improved properties on a wide range of substrates, including difficult to bond substrates such as polyvinyl chloride, Mylar (polyester film from DuPont) and aluminum.

In addition, we have found that the heat resistance of the hot melt adhesives of the invention may be even further improved by utilizing an ethylenically unsaturated monomer which contains moisture reactive functional (crosslinking) groups. The resultant hot melt adhesive, upon curing, produces an adhesive consisting of a crosslinked polyurethane and a crosslinked ethylenically unsaturated polymer, i.e., a fully interpenetrating network (IPN) adhesive. As such, these adhesive compositions are particularly adapted for use in structural applications including those where epoxy adhesives are now primarily employed.

In accordance with the general procedure of the present invention, the low molecular weight polymer may be added to a polyol component prior to reaction with the isocyanate components or it may be added to the already formed prepolymer. The products of this invention may also be formed through the simultaneous polymerization of the urethane prepolymer and the ethylenically unsaturated monomers. The polyurethane prepolymer may also be polymerized in the ethylenically unsaturated monomers, which are then subsequently polymerized to form the product of the invention. Alternatively if a polyol is used to form the prepolymer, the ethylenically unsaturated monomers may be polymerized in the polyol using free radical polymerization procedures. In this case, the isocyanate components are subsequently polymerized with the mixture using conventional condensation polymerization procedures. This latter polymerization procedure has the advantage of excellent control of the molecular weight of the resulting vinyl polymer (as determined by intrinsic viscosity) and also produces a polymer which is free of detrimental impurities. In addition, the reduction in the handling and inventory of materials and elimination of intermediate packaging and storage bring about significant cost savings.

In the specific embodiment wherein an ethylenically unsaturated monomer containing moisture reactive functional groups is employed, the reactive nature of the crosslinking monomer requires that the monomer be added after the prepolymer has been formed. Thus, in this embodiment, the (co)polymer may be added in its polymerized form to the already formed prepolymer. Alternatively, and more preferably, the monomer or monomers are added to the already formed polyurethane prepolymer and polymerized therein using free radical polymerization procedures.

DETAILED DESCRIPTION OF THE PREFERRED EMBODIMENTS

Any ethylenically unsaturated monomer capable of free radical polymerization and which does not contain active hydrogen may be used herein. Most commonly employed are the $C_1$ to $C_{12}$ esters of acrylic and methacrylic acids including, but not limited to methyl acrylate, ethyl acrylate, n-butyl acrylate, isobutyl acrylate, n-propyl or iso-propyl acrylate as well as the corresponding methacrylates. Mixtures of compatible (meth)acrylate monomers may also be used. Such mixtures, including mixtures of butyl and methyl methacrylate are well known in the art. Additional ethylenically unsaturated monomers such as vinyl esters (e.g., vinyl acetate and vinyl propionate), vinyl ethers, fumarates, maleates, styrene, acrylonitrile, ethylene, vinyl ethers, etc. may be used as may copolymers thereof. The choice of the particular monomer(s) is largely dependent upon the desired end use of the adhesives. For example, one skilled in the art would recognize that selection of certain monomers will produce a pressure sensitive adhesive, while other monomers will give a non-pressure sensitive material. Similarly, appropriate monomers may be selected to formulate structural adhesives, conductive adhesives, etc.

In the embodiment wherein the ethylenically unsaturated monomer contains moisture reactive functional groups, any such monomer containing moisture reactive (curable) functional groups may be employed. In particular, monomers containing silane or reactive isocyanate functionality are particularly useful herein.

Typical of useful silane or isocyanate containing ethylenically unsaturated copolymers are those which contain only mers derived from an ethylenically unsaturated monomer containing silane or isocyanate functional groups or those which contain up to 99% by weight of mers derived from a non-silane or non-isocyanate containing ethylenically unsaturated monomer capable of free radical polymerization. Thus, the final ethylenically unsaturated silane or isocyanate containing copolymer may contain 1-100% of the polymerized ethylenically unsaturated silane or isocyanate monomer, preferably up to 50% by weight and more preferably (from an economic standpoint) 5-30% by weight. Indeed, levels of ethylenically unsaturated silane or isocyanate containing monomers in the range of 15% or less have been shown to provide potentially commercially significant results.

The ethylenically unsaturated silanes are preferably those which will participate directly in the reaction by free-radical polymerization and which do not contain active hydrogen. Representative commercially available silanes of this type include with vinyltrichlorosilane, vinyltriethoxysilane, vinyltrimethoxysilane, vinyltris(2-methoxyethoxy)silane, 3-methacryloxypropyltrimethoxysilane, 3-methacryloxypropyltris(2-methoxyethoxy)silane, vinyltriacetoxysilane, 4-(3-trimethoxysilylpropyl)benzylstyrene sulfonate, 3-acryloxypropyltrimethoxysilane, allyltriethoxysilane, allyltrimethoxysilane, vinylmethyldiethoxysilane, vinyldimethylethoxysilane, vinylmethyldiacetoxysilane, 3-methyacryloxypropylmethyldiethoxysilane, 3-acryloxypropyldimethylmethoxysilane, etc.

The ethylenically unsaturated isocyanates are also preferably those which will participate directly in this reaction by free-radical polymerization and which do not contain active hydrogen. Representative commercially available isocyanates of this type include isocyanatoethyl methacrylate and m-isopropenyl-$\alpha,\alpha$-dimethylbenzyl isocyanate.

As discussed above, any ethylenically unsaturated monomer capable of free radical polymerization and which does not contain active hydrogen may be employed as a comonomer in forming the final silane or isocyanate containing copolymer. Most commonly employed are the $C_1$ to $C_{12}$ esters of acrylic and methacrylic acids including, but not limited to methyl acrylate, ethyl acrylate, n-butyl acrylate, isobutyl acrylate, n-propyl or iso-propyl acrylate as well as the corresponding methacrylates. Mixtures of compatible (meth)acrylate monomers may also be used. Such mixtures, including mixtures of butyl and methyl methacrylate are well known in the art. Additional ethylenically unsaturated monomers such as vinyl esters (e.g., vinyl acetate and vinyl propionate), vinyl ethers, fumarates, maleates, styrene, acrylonitrile, ethylene, vinyl ethers, etc. may be used as may copolymers thereof. The choice of the particular monomer(s) is largely dependent upon the desired end use of the adhesives. For example, one skilled in the art would recognize that selection of certain monomers will produce a pressure sensitive adhesive, while other monomers will give a non-pressure sensitive material. Similarly, appropriate monomers may be selected to formulate structural adhesives, conductive adhesives, etc.

The urethane prepolymers are those conventionally used in the production of polyurethane hot melt adhesive compositions. Most commonly, the prepolymer is prepared by the condensation polymerization of a polyisocyanate with a polyol, most preferably the polymerization of a diisocyanate with a diol. The polyols used include polyhydroxy ethers (substituted or unsubstituted polyalkylene ether glycols or polyhydroxy polyalkylene ethers), polyhydroxy polyesters, the ethylene or propylene oxide adducts of polyols and the monosubstituted esters of glycerol.

In addition, the urethane prepolymers may be prepared by the reaction of a polyisocyanate with a polyamino or a polymercapto-containing compound such as diamino polypropylene glycol or diamino polyethylene glycol or polythioethers such as the condensation products of thiodiglycol either alone or in combination with other glycols such as ethylene glycol, 1,2-propylene glycol or with other polyhydroxy compounds disclosed above. Also, small amounts of low molecular weight dihydroxy, diamino, or amino hydroxy compounds may be used such as saturated and unsaturated glycols e.g. ethylene glycol or condensates thereof such as diethylene glycol, triethylene glycol, and the like; ethylene diamine, hexamethylene diamine and the like; ethanolamine, propanolamine, N-methyldiethanolamine and the like.

Any suitable organic polyisocyanate may be used such as, for example, ethylene diisocyanate, ethylidene diisocyanate, propylene diisocyanate, butylene diisocyanate, hexamethylene diisocyanate, toluene diisocyanate, cyclopentylene-1,3,-diisocyanate, cyclohexylene-1,4-diisocyanate, cyclohexylene-1,2-diisocyanate, 4,4'-diphenylmethane diisocyanate, 2,2-diphenylpropane-4,4'-diisocyanate, p-phenylene diisocyanate, m-phenylene diisocyanate, xylylene diisocyanate, 1,4-naphthylene diisocyanate, 1,5-naphthylene diisocyanate, diphenyl-4,4'-diisocyanate, azobenzene-4,4'-diisocyanate, diphenylsulphone-4,4'-diisocyanate, dichlorohexamethylene diisocyanate, furfurylidene diisocyanate, 1-chlorobenzene-2,4-diisocyanate, 4,4',4"-triisocyanato-triphenylmethane, 1,3,5-triisocyanato-benzene, 2,4,6-triisocyanato-toluene, 4,4'-dimethyldiphenylmethane-2,2',5,5-tetraisocyanate, and the like.

The polyisocyanate and polyol, polyamino or polymercapto components are combined in proportions so as to yield a urethane prepolymer characterized by an isocyanate content of from about 0.25 to about 15%, preferably to about 10%, and most preferably from 1.5 to 5%. In addition, the ratio of isocyanate equivalents to hydroxyl, amino or mercapto equivalents (known as the isocyanate index) should be greater than 1 but no more than about 2. By maintaining the low isocyanate index, we are able to reduce the level of free isocyanate content in the final hot melt adhesive composition to less than about 4%, preferably less than 1%. It will be recognized that the presence of higher levels of free isocyanate has a detrimental effect on a hot melt formulation since it causes toxic fumes to be released when the adhesive is heated to application temperature. The higher levels of free isocyanate may also cause reduction in viscosity and poorer initial bond strength of the adhesive. The precise amount of the polyisocyanate used in the polymerization will depend on the equivalent weight and amount of the non-isocyanate components, and the particular polyisocyanate employed. In general, the amount of the polyisocyanate needed to achieve the isocyanate content will vary from about 5 to about 55% of the final prepolymer.

In accordance with the broadest scope of the invention, the ethylenically unsaturated monomer may be polymerized using conventional free radical polymerization procedures to a relatively low molecular weight. For purposes of clarification herein, by "low molecular weight" we mean weight average molecular weight in the range of approximately 10,000 to 30,000. The low molecular weight is obtained by careful monitoring and controlling the reaction conditions and, generally, by carrying out the reaction in the presence of a chain transfer agent such as dodecyl mercaptan. There is a recognized correlation between intrinsic viscosity and molecular weight and we have found that, in general, monomers polymerized to an intrinsic viscosity of 0.1 to 0.4 (I.V. as measured in a 9:1 mixture of tetrahydrofuran and alcohol) are particularly preferred for use herein. In this embodiment, the low molecular weight polymer is then blended either with the polyol and dissolved therein prior to reaction with the isocyanate component or the low molecular weight polymer is dissolved in the already formed urethane prepolymer. In the case of polyamino or polymercapto containing prepolymers, in-situ vinylic polymerization must be performed only in the pre-formed prepolymer. In either case, low molecular weight polymer is combined with the isocyanate terminated urethane prepolymer in a proportion such that the reactive curing hot melt adhesive contains about 5 to 90% of the urethane prepolymer and 95% to 10% of the low molecular weight polymer. Care should be taken in storing and handling the low molecular weight polymer to avoid contamination with ambient moisture or other factors which might affect the stability of the prepolymer system. The resultant hot melt adhesive may then be applied in molten form to the substrate to be bonded using techniques known to those skilled in the art. The urethane hot melt cures over time with ambient moisture to form a crosslinked network.

In accordance with an alternate method for preparing the urethane prepolymers of the invention, where the ethylenically unsaturated monomers do not contain reactive functional groups, and wherein a polyol is employed, the monomers are combined in an amount of about 2 to 90% by weight with 10 to 98% by weight of the polyol and polymerized therein using conventional free radical polymerization procedures in the presence of a chain transfer agent such as dodecyl mercaptan to achieve the low molecular weight polymer dissolved in the polyol. Subsequent to the polymerization of the ethylenically unsaturated monomer(s), the polyisocyanate and any additional ingredients required for the urethane prepolymer forming reaction are added and that reaction is carried out using conventional condensation polymerization procedures. In this manner, the resultant isocyanate terminated urethane prepolymer forms the reactive curing hot melt adhesive described above which contains about 5 to 90% of the urethane prepolymer and 95 to 10% of the low molecular weight polymer which may be applied in molten form to the substrate cured over time with ambient moisture to form a crosslinked network moisture to form a crosslinked network.

It is also possible in the case of monomers which do not contain isocyanate reactive functional groups to polymerize the low molecular weight polymer in the presence of the already formed isocyanate terminated urethane prepolymer. This method has the drawback of subjecting the prepolymer to unnecessary heating during the acrylic polymerization, heating that might result in branching, viscosity increase, depletion of needed isocyanate groups and possible gellation. Although these disadvantages are subject to control, more stringent control of conditions are required as compared to polymerization in the non-isocyanate functional urethane components. When the reaction is run in the polyol or other non-isocyante containing component, there is also the advantage of lower reaction viscosities and reduced exposure to isocyanate vapors because of the lesser amount of heating required.

As discussed previously, the resultant hot melt adhesives which are solid at room temperature have appropriate application viscosities within the range of 3000 to 50,000 cps at 120° C. (which corresponds to about 1500 to 25,000 at 135° C. and 10,000 to about 100,000 at 108° C.) and thus require no additional tackifiers and/or plasticizers in order to achieve these application viscosities. It is noted, however, that small amounts of tackifiers or plasticizers may be added so long as their presence does not serve as a detriment to the desired adhesive properties.

Not only do the adhesives cure to form a strong heat resistant bond, they also exhibit high initial adhesive and cohesive strength so that the bonded structure, even before curing, can be readily handled and subjected to further processing operations. As such, they are readily adapted to a wide variety of applications for which hot melt adhesives are commonly used, especially those applications which require a high degree of heat resistance as might be encountered in processing or sterilizing operations including, but not limited to, laminating, bookbinding, labelling of bottles and pouches, automotive interior assembly, fabrication of non-woven products for medical uses, etc.

Additionally, the hot melt adhesive and gasketing compositions of the present invention may be foamed using conventional chemical or mechanical foaming techniques, with or without the use of accelerators using procedures such as are disclosed in U.S. Pat. Nos.

4,059,466; 4,059,714; 4,156,754; 4,259,402; 4,679,710; 4,601,427; 4,535,919; 4,405,063; 4,371,096; 4,264,214; and 4,200,207, the disclosures of which are incorporated herein by reference. When thus foamed, the resulting products represent a novel class of foamed thermosetting adhesives and gaskets curable with ambient moisture. As such, the foamed materials are useful for a variety of gasketing or cushioning applications.

It is hypothesized that these superior properties of the hot melt materials of the invention are due, in part, to the formation of semi-interpenetrating and interpenetrating networks as well as, in some cases, the formation of graft copolymers. The semi-interpenetrating network would result when the urethane prepolymer (a thermoset) is used with a free radically polymerized polymer which contains no crosslinking groups (thermoplastic). When the free radically polymerized polymer contains crosslinking groups, a fully interpenetrating network will result. Grafting occurs with certain types of urethane prepolymer components such as those containing a carbon atom bearing a tertiary hydrogen atom. Such tertiary hydrogen atoms are potential graft sites for the acrylic or vinyl monomers.

This invention can be further illustrated by the following examples of preferred embodiments thereof, although it will be understood that these examples are included merely for purposes of illustration and are not intended to limit the scope of the invention unless otherwise specifically indicated.

EXAMPLE I

A one liter reaction vessel was set up equipped with a condenser, gas inlet tube, slow addition tube, thermometer, stirrer, and provisions for heating/cooling. The ingredients of the reaction consisted of the following:

| | | |
|---|---|---|
| 1. Polypropylene glycol (1000 mol wt.) | 275.8 gm | |
| 2. 1,6-hexane diol, neopentyl glycol adipate (3000 M.W.) | 88.9 gm | |
| 3. 1,6-hexane diol, neopentyl glycol adipate (1000 M.W.) | 29.3 gm | |
| 4. Butyl methacrylate | 17.8 gm | |
| 5. Butyl methacrylate | 94.1 gm | |
| 6. Methyl methacrylate | 9.4 gm | |
| 7. Methyl methacrylate | 53.6 gm | |
| 8. Dodecyl mercaptan | 0.68 gm | |
| 9. Benzoyl peroxide | 1.7 gm | |
| 10. Benzoyl peroxide | 0.6 gm | |
| 11. Methylene bis phenyl diisocyanate | 131.1 gm | |

The reaction vessel was purged with dry nitrogen and a slow stream of dry nitrogen was bubbled subsurface throughout the reaction. Ingredients designated 1, 2, 3, 4, 6, 8 and 9 were added to the vessel and the temperature raised to 80° C. After ½ hr at 80° C. ingredients 5 and 7 were added uniformly over a period of 1 hr. The reaction was held at 80° C. for an additional three hours, at which time 10 was added. The reaction was held an additional 2 hrs. @ 80° C. and 11 was added; then the temperature was raised to 100° C. and held for three hours. At this point a vacuum of 120 mm to 130 mm was applied to the vessel for 20 minutes to 30 minutes and the reaction poured hot from the flask.

| Properties: | |
|---|---|
| % Methacrylate polymer | 25% |
| Ratio of butyl methacrylate to methyl | 64 to 36 |
| methacrylate | |
| % Urethane prepolymer | 75% |
| % isocyanate groups | 1.9% |
| Viscosity at 100° C. | 64,000 cps |
| Viscosity at 120° C. | 25,250 cps |
| Viscosity at RT | Solid |
| Intrinsic Viscosity in tetrahydrofuran/ethanol = 9/1 | 0.18 |
| Color | water white to very slightly amber |
| Clarity | clear to very slightly hazy |
| Calculated urethane prepolymer mol. wt. | 3315 mol. wt. |
| Isocyanate Index | 1.6 |

EXAMPLE II

An experiment was run as in Example I where the viscosity of the system was lowered by reducing the molecular weight of the urethane prepolymer as an alternative method to that of reducing the molecular weight of the methacrylate resin. All factors were the same except for the following:

| | A | B |
|---|---|---|
| Ingredients | | |
| Butyl methacrylate | 18.0 gm | 18.0 gm |
| Butyl methacrylate | 102.0 gm | 102.0 gm |
| Methyl methacrylate | 10.1 gm | 10.1 gm |
| Methyl methacrylate | 57.4 gm | 57.4 gm |
| Dodecyl mercaptan | 0.63 gm | 0.72 gm |
| Benzoyl peroxide | 1.8 gm | 1.8 gm |
| Methylene bis phenyldiisocyanate | 168.6 gm | 168.6 gm |
| The properties were: | | |
| Properties: | | |
| % Methacrylate polymer | 25% | 25% |
| Ratios of butyl methacrylate to methylmethacrylate | 64 to 36 | 64 to 36 |
| % Urethane prepolymer | 75% | 75% |
| % isocyanate groups | 3.1% | 3.3% |
| Viscosity at 100° C. | 53,000 cps | 51,000 cps |
| Viscosity at 120° C. | not measured | 7,062 cps |
| Viscosity at room temperature | Solid | Solid |
| Intrinsic viscosity in THF/ETOH = 9/1 | 0.18 | 0.15 |
| Color | water white to very slightly amber | |
| Clarity | clear to very slightly hazy | |
| Calculated urethane prepolymer molecular weight | 2032 mol. wt. | 1909 mol. wt. |
| Isocyanate Index | 2.0 | 2.0 |

EXAMPLE III

This example discloses the preparation of a urethane prepolymer composed of a combination of 70% polypropylene glycol of molecular weight 1000 M.W. and 30% 1,6-hexane diol neopentyl glycol adipate diol of 2000 molecular weight with sufficient methylene bis phenyl diisocyanate to provide 2% NCO content in the prepolymer.

| Ingredients: | |
|---|---|
| Polypropylene glycol (1000 molecular weight) | 350.0 |
| 1,6-hexane diol neopentyl glycol adipate diol (2000 mol. wt.) | 150.0 |
| Methylene bis phenyl diisocyanate | 166.4 |

Procedure

A one liter reaction vessel was equipped with a condenser, gas inlet tube, thermometer, stirrer, and provisions for heating and cooling. The reaction vessel was purged with dry nitrogen and a slow stream was bled through the vessel. The polyols were added to the vessel and the temperature was raised to 80° C. At this point, the diisocyanate was added and the reaction was heated to 100° C. and held at that temperature for 4 hrs. After the 4 hr. heating period, the reaction was poured hot from the vessel.

The properties of the urethane prepolymer were:

| Properties: | |
|---|---|
| % isocyanate groups | 2.3% |
| Viscosity at 100° C. | 3200 cps |
| Viscosity at room temperature | 800,000 cps |
| Color | very slightly amber |
| Clarity | clear |
| Isocyanate Index | 1.6 |

EXAMPLE IV (COMPARATIVE)

This example is provided to illustrate the production of a hot melt adhesive according to U.S. Pat. No. 3,931,077 using a blend of a polyurethane prepolymer, a thermoplastic resin and a tackifier.

| | |
|---|---|
| Prepolymer from Example III | 60 |
| CRL 715 (a 35% n-butyl acrylate - 65% ethylene copolymer having a melt index of 70 from USI) | 5 |
| PRL-300 (a terpene phenolic resin having a softening point of 108° C. from Reichhold Chemical) | 35 |

The urethane prepolymer was placed in a three-neck flask and heated to 167° F. under dry nitrogen gas, the two additional ingredients were added and stirred under nitrogen until dissolved. The adhesive was designated IVA.

A second hot melt adhesive (designated IVB) was formulated as above using 10 parts Exxon EX 170 (25% vinyl acetate, 75% ethylene with a melt index of 2400); 25 parts of the PRL-300 and 65 parts of the urethane prepolymer of Example III.

Testing

The following series of tests have been developed to characterize the adhesives of this invention and measure their effectiveness.

Tensile and elongation of cured free films: This test measures the strength of the film and its elasticity. The tensile strength and degree of elongation are related to a materials' utility as an adhesive. In general a material that possesses high tensile strength and appropriate elongation will show better adhesive performance than a material which is poor in one or both categories.

In this test, films were cast from the melt on a low energy surface at approx. 3–5 mils thickness. (Films in this range had to be used as heavier films developed excessive voids on curing.) The films were cured by exposing them to the atmosphere, in a constant temperature room with 22° C. and 50% R.H., for one week.

Adhesion Test: Samples where prepared using various flexible substrates by coating the substrate with 1.0 mil of molten adhesive and immediately laminating to a ⅜" particle board by subjecting the lamination to 10 minutes in a cold press at approx 5 psi. pressure. All samples were allowed 1 week to cure or crosslink. They were then subjected to a 90° peel test at a withdrawal rate of 12 inches per minute.

Heat Resistance: As most hot melts are thermoplastic and deform or flow when subjected to temperatures above 82° C., we have devised a series of shear tests at elevated temperatures, to measure resistance to flow or deformation at higher temperatures, up to 175° C.

In this test a lap shear of 5 mil bare aluminum foil to ⅜" particle board with an adhesive application of 1 mil is used. All samples were cured 1 week. The samples were placed in a circulating air oven at 108° C. with a load of 1 kilogram per sq. inch. They were allowed to remain at this temperature for 15 min, then the temperature was elevated to 120° C. and observed for 15 min. and then again the temperature was elevated at regular intervals until failure was observed.

Green Strength: This test measures the bond immediately after application and bonding. This is important as it tests the strength of the uncured, material prior to curing. Sufficient green strength must be present to hold substrates together when combined, and while the cure develops with ambient moisture. Green strength or immediate bond strength prior to cure as well as rate of cure, is very important for the fabrication or lamination process prior to full cure.

In this test, the adhesive samples in molten condition at 120° C. were coated at exactly 1.0 mil thickness on 2 mil (1 inch width) Mylar film and immediately nipped to 5 mil aluminum foil. The resultant lamination of Mylar/Adhesive/Foil was then peeled immediately, and after the indicated times using an Instron tester at 12 inch/min.

| Comparison of Viscosity at 120° C. | |
|---|---|
| Example | Visc. @ 120° C. (Thermocel) |
| I | 11,625 cps |
| IIB | 5,500 cps |
| III | 1,138 cps |
| IVA | 9,000 cps |
| IVB | 5,000 cps |

| Comparison of Tensile/Elongation | | |
|---|---|---|
| Example | Ultimate Tensile | % Elongation |
| I | 1,350 psi | 460% |
| IIB | 3,250 psi | 440% |
| III | 667 psi | 440% |
| IVA | 960 psi | 520% |
| IVB | 200 psi | 1400% |

Note low tensiles in III and IV, and the increased tensile with good elongation of I and II which are examples of this invention. Also note higher tensile in II which correlates with higher NCO content.

| Adhesion Test Results | | | | |
|---|---|---|---|---|
| | 5 mil Bare Alum Foil | 2 mil Mylar | 6 mil Woodgrain Vinyl | 4 mil Embossed White Vinyl |
| Example I | 6.5 lbs$^{FT}$ | 4.2 lbs$^{FT}$ | 5.5 lbs$^{FT}$ | 4.5 lbs$^{FT}$ |
| Example II A | 5.5 lbs$^{FT}$ | 1.5 lbs | 6.5 lbs$^{FT}$ | 5.5 lbs$^{FT}$ |

-continued

| | Adhesion Test Results | | | |
|---|---|---|---|---|
| | 5 mil Bare Alum Foil | 2 mil Mylar | 6 mil Woodgrain Vinyl | 4 mil Embossed White Vinyl |
| Example III | 1.7 lbs | 1.8 lbs | 6.6 lbs$^{FT}$ | 5.2 lbs |
| Example IV A | 7.6 lbs$^{FT}$ | 0.4 lbs | 0.2 lbs | 4.0 lbs$^{FT}$ |
| Example IV B | 6.7 lbs$^{FT}$ | 0.9 lbs | 7.0 lbs$^{FT}$ | 4.5 lbs$^{FT}$ |

FT = fiber test

Examples I and II both gave excellent bonds to most substrates and Example I gave excellent adhesion to all substrates including Mylar. Note failure was FT (fiber tear). The adhesive carried with it the top fibers of the particle board substrate. Example II lacked adhesion only to Mylar. Example III lacked adhesion to foil and Mylar; Example IVA to Mylar and vinyl and Example IVB to Mylar.

| | Comparison of Heat Resistance | | | | | |
|---|---|---|---|---|---|---|
| Example | 108° C. | 120° C. | 134° C. | 150° C. | 162° C. | 175° C. |
| I | OK | OK | OK | OK | 13 minutes to fail | — |
| II (A & B) | OK | OK | OK | OK | OK | 8 hours |
| III | OK | OK | OK | 9 minute to fail | — | — |
| IV A | 1 minute to fail | — | — | — | — | — |
| IV B | 1 minute to fail | — | — | — | — | — |

This test illustrates the poor heat resistance of Examples IVA and IVB (examples of the prior art) and the superior heat resistance of Example I and II, with Example II the high NCO type, giving the best heat resistance.

| | Comparison of Bond Strength | | | | |
|---|---|---|---|---|---|
| | Example I | Example II (A) | Example III | Example IVA | Example IVB |
| Immediate (green) | 300 gms | 170 gms | 20 gms | 120 gms | 2100 gms |
| 1 hour | 375 gms | 170 gms | 25 gms | 205 gms | 1800 gms |
| 2 hours | 375 gms | 172 gms | 65 gms | 206 gms | 1850 gms |
| 3 hours | 363 gms | 180 gms | 125 gms | 375 gms | 1800 gms |
| 24 hours | 1200 gms | 680 gms | 700 gms | 425 gms | 1900 gms |
| 48 hours | 1200 gms | N/T | N/T | 272 gms | 908 gms |
| 1 week | 1500 gms | N/T | N/T | 91 gms | 771 gms |

N/T = Not Tested

The above test results clearly indicate the superior properties of the hot melts of the present invention over the prepolymer with no acrylic added and also over the material covered in U.S. Pat. No. 3,931,077, with respect to bond strength and heat resistance particularly after aging. Note, in particular, that while the initial bond strength of the adhesive of Example IVB appears superior, there is a progressive deterioration of bond strength performance over time while the bond strengths of the compositions of the invention progressively improve over the same aging period. In addition, as shown in the prior table, the heat resistance of the adhesive of Example IVB is substantially inferior to that of the adhesives of the invention.

The following examples incorporate modifications of the most preferred embodiment so as to illustrate various aspects of the invention.

EXAMPLE V

The procedure of Example I was repeated except that 0.8 gm dodecyl mercaptan was used instead of 0.68 gm. This change was made to reduce the molecular weight (as indicated by a lower intrinsic viscosity) of the methacrylate copolymer portion of the product and thus reduce the viscosity of the product.

The properties were:

| Properties: | |
|---|---|
| % Methacrylate polymer | 25% |
| Ratio of butyl methacrylate to methyl methacrylate | 64 to 36 |
| % Urethane prepolymer | 75% |
| % isocyanate groups | 2.0% |
| Viscosity at 100° C. | 18,000 cps |
| Viscosity at room temperature | Solid |
| Intrinsic viscosity in tetrahydrofuran/ethanol = 9/1 | 0.15 |
| Color | water white to very slightly amber |
| Clarity | clear to very slightly hazy |
| Isocyanate Index | 1.6 |

EXAMPLE VI

An experiment was run as in Example I except that the docedyl mercaptan chain transfer agent was decreased to 0.54 gm in order to increase the molecular weight of the methacrylate polymer and thus increase the viscosity as compared to Example II.

The properties were:

| Properties: | |
|---|---|
| % Methacrylate polymer | 25% |
| Ratio of butyl methacrylate to methyl methacrylate | 64 to 36 |
| % Urethane prepolymer | 75% |
| % isocyanate groups | 3.0% |
| Viscosity at 100° C. | 72,000 cps |
| Viscosity at 120° C. | 16,250 cps |
| Viscosity at room temp. | Solid |
| Intrinsic visoosity in THF/ETOH = 9/1 | 0.15 |
| Color | water white to very slightly amber |
| Clarity | clear to very slightly hazy |
| Isocyanate Index | 1.6 |

EXAMPLE VII

The following example represents a variations of Example I in the following significant areas:

(1) Change in ratio of methacrylate polymer to urethane prepolymer from 25/75 to 30/70.

(2) Change in ratio of butylmethacrylate to methyl methacrylate from 64/36 to 80/20.

(3) Change in composition of the urethane prepolymer from polypropylene glycol/1,6-hexane diol, neopentyl glycol adipate-methylene bis phenyl diisocyanate to polypropylene glycol-methylene bis phenyl diisocyanate.

This example was run as in Example I except that the following amounts were used.

| Ingredients | |
|---|---|
| Polypropylene glycol (1000 mol wt.) | 300.3 |
| Butyl methacrylate | 23.0 |
| Butyl methacrylate | 130.6 |
| Methyl methacrylate | 5.8 |
| Methyl methacrylate | 32.6 |
| Dodecyl mercaptan | 0.3 gm |
| Benzoyl peroxide | 1.9 gm |
| Benzoyl peroxide | 0.6 gm |
| Methylene bis phenyl diisocyanate | 147.8 gm |
| The properties were: | |
| Properties: | |
| % Methacrylate polymer | 30% |
| Ratio of butyl methacrylate to methyl methacrylate | 80 to 20 |
| % urethane prepolymer | 70.0% |
| % isocyanate groups | 3.9% |
| Viscosity at 100° C. | 104,000 cps |
| Viscosity at room temperature | Solid |
| Intrinsic viscosity in THF/ETOH = 9/1 | 0.19 |
| Color | water white |
| Clarity | clear to very slightly hazy |
| Isocyanate Index | 2.0 |

EXAMPLE VIII

The following example illustrates the use of a different acrylate monomer. The example was run as in Example I but with the ingredients as noted below.

| Ingredients: | |
|---|---|
| Polypropylene glycol (mol. wt. 1000) | 326.4 gm |
| Butyl acrylate | 150.0 gm |
| Dodecyl mercaptan | 0.3 gm |
| Benzoyl peroxide | 2.0 gm |
| Methylene bis phenyl diisocyanate | 122.8 gm |
| Properties: | |
| % Acrylate polymer | 25.0% |
| % Urethane prepolymer | 75.0% |

-continued

| | |
|---|---|
| % isocyanate groups | 1.7% |
| Viscosity at 100° C. | 7200 cps |
| Viscosity at room temperature | >2.8 × 10⁶ |
| Intrinsic viscosity in THF/ETOH = 9/1 | 0.15 |
| Color | lt. brown |
| Clarity | opaque |
| Isocyanate Index | 1.5 |

EXAMPLE IX

In this example, an isocyanate other than methylene bis phenyl diisocyanate was used. The example was run as in Example I but with the ingredients noted below.

| Formula | gm. |
|---|---|
| Polypropylene glycol (1000 mol. wt.) | 275.7 |
| 1,6-hexane diol, neopentyl adipate diol (2000 mol. wt.) | 118.2 |
| Butyl methacrylate | 17.8 |
| Butyl methacrylate | 94.1 |
| Methyl methacrylate | 9.1 |
| Methyl methacrylate | 53.6 |
| Dodecyl mercaptan | 0.68 |
| Benzoyl peroxide | 1.7 |
| Benzoyl peroxide | 0.6 |
| Methylene bis cyclohexyl diisocyanate | 137.4 |
| Dibutyl tin dilaurate | 0.08 |
| Properties: | |
| % Methacrylate polymer | 25% |
| Ratio of butyl methacrylate to methyl methacrylate | 64–36 |
| % Urethane prepolymer | 75% |
| % Isocyanate groups | 2.2% |
| Viscosity at 120° C. | 5000 cps (est) |
| Viscosity at RT | Solid |
| Intrinsic Viscosity in tetrahydrofuran/ethanol = 9/1 | .13 |
| Color | Water White |
| Clarity | Clear |
| Isocyanate Index | 1.6 |

EXAMPLE X

In this example, a catalyst was added to accelerate the cure speed. Again, the reaction was run using the procedure of Example I.

| Formula | gm. |
|---|---|
| Polypropylene glycol (1000 mol. wt.) | 275.7 |
| 1,6-hexane diol, neopentyl adipate diol (2000 mol. wt.) | 118.2 |
| Butyl methacrylate | 17.8 |
| Butyl methacrylate | 94.1 |
| Methyl methacrylate | 9.4 |
| Methyl methacrylate | 53.6 |
| Dodecyl mercaptan | 0.68 |
| Benzoyl peroxide | 1.7 |
| Benzoyl peroxide | 0.6 |
| Methylene bis phenyl diisocyanate | 131.1 |
| Dibutyl tin dilaurate | 0.30 |
| Properties: | |
| % Methacrylate polymer | 25% |
| Ratio of butyl methacrylate to methyl methacrylate | 64 to 36 |
| % Urethane prepolymer | 75% |
| % Isocyanate groups | 1.9% |
| Viscosity at 100° C. | 84,000 cps |
| Viscosity at RT | Solid |
| Intrinsic Viscosity in tetrahydrofuran/ethanol = 9/1. | .17 |
| Color | Water White to Very Slightly Amber |
| Clarity | Clear to Very Slightly Hazy |

| Isocyanate Index | 1.6 |

EXAMPLE XI

In this example, the procedure of Example I was repeated with the acrylate comonomers replaced by styrene. The ingredients and properties follow.

| Ingredients: | gm. |
|---|---|
| Polypropylene glycol (1000 mol. wt.) | 275.7 |
| 1,6-hexane diol, neopentyl adipate diol (2000 mol. wt.) | 118.2 |
| Styrene | 174.9 |
| Dodecyl mercaptan | 0.68 |
| Benzoyl peroxide | 1.7 |
| Benzoyl peroxide | 0.6 |
| Methylene bis phenyl diisocyanate | 131.1 |
| Properties: | |
| % Styrene polymer | 25% |
| % Urethane prepolymer | 75% |
| % Isocyanate groups | 1.7 |
| Viscosity at RT | Solid |
| Intrinsic Viscosity in tetrahydrofuran/ethanol = 9/1 | 0.23 |
| Color | Sl. Yellow |
| Clarity | Cloudy |
| Isocyanate Index | 1.6 |

EXAMPLE XII

Again, the procedures of Example I was repeated with the acrylate copolymer replaced by vinyl acetate. The ingredients and properties follow.

| Ingredients: | gm. |
|---|---|
| Polypropylene glycol (1000 mol. wt.) | 275.7 |
| 1,6-hexane diol, neopentyl adipate diol (2000 mol. wt.) | 118.2 |
| Vinyl acetate | 174.9 |
| Dodecyl mercaptan | 0.68 |
| Benzoyl peroxide | 1.7 |
| Benzoyl peroxide | 0.6 |
| Methylene bis phenyl diisocyanate | 137.4 |
| Properties: | |
| % Vinyl acetate polymer | 25% |
| % Urethane prepolymer | 75% |
| % Isocyanate groups | 2.0 |
| Viscosity at 121° C. | 1800 cps |
| Viscosity at RT | >4 × $10^6$ cps |
| Intrinsic Viscosity in tetrahydrofuran/ethanol = 9/1 | 0.15 |
| Color | Sl. Amber |
| Clarity | Cloudy |
| Isocyanate Index | 1.6 |

EXAMPLE XIII

This example illustrates the addition of a commercially available low molecular weight polymer to the urethane prepolymer to produce a hot melt adhesive in accordance with an alternate embodiment of the present invention. Elvacite 2013 is a 64% butylmethacrylate/36% methylmethacrylate copolymer of I.V. 0.2 available from DuPont. The Elvacite was vacuum dried in a desicator for 24 hours immediately prior to use herein.

| Ingredients: | |
|---|---|
| Polypropylene Glycol (1000 Mol. wt.) | 472.9 gm |
| 1,6-hexanediol neopentyl glycol adipate (2000 Mol. wt.) | 202.7 |
| Elvacite 2013 | 300.0 |
| Methylene bisphenyl diisocyanate | 224.9 |

Procedure

The polyols and the Elvacite 2013 were added to the vessel and heated to 100° C. until the Elvacite was dissolved. At that point the methylene bisphenyl diisocyanate was added, and the reaction was held at 100° C. for 3 hrs. After the 3 hours at 100° C. the reaction was poured hot from the vessel. The samples had the following properties:

| Properties | |
|---|---|
| % Methylacrylate polymer | 25% |
| % Urethane prepolymer | 75% |
| % Isocyanate groups | 2.0% |
| Viscosity at 100° C. | 86,000 cps |
| Viscosity at 120° C. | 8,000 cps |
| Viscosity at room temp. | Solid |
| Intrinsic viscosity in THF/ETOH | 0.25 |
| Color | water white |
| Clarity | clear to very slightly hazy |
| Isocyanate Index | 1.6 |
| Test Results | |
| Ultimate Tensile Strength | 1700 psi |
| % Elongation | 400% |
| Viscosity Stability at 120° C.: | |
| initial | 8,000 cps |
| after 8 hours | 12,125 cps |
| Bond Strength (foil/mylar): | |
| immediate | 908 gms |
| 1 hour | 1025 gms |
| 2 hours | 1040 gms |
| 3 hours | 1100 gms |
| 24 hours | 1750 gms |
| Adhesion test (90° C. peel): | |
| Mylar | 1.7 lbs. |
| 5 ml foil | 5.5 lbs. |
| Woodgrain vinyl | 6.9 lbs. FT |
| white vinyl | 5.7 lbs: FT |
| Heat Resistance (2 psi): | |
| 180° C. | OK |
| 120° C. | OK |
| 134° C. | OK |
| 150° C. | OK |
| 162° C. | 10 minutes to failure |

EXAMPLE XIV

For the purposes of comparison of initial (green) strength properties, additional adhesives (designated 1-4) were prepared according to the invention using the procedures discussed previously. Five other adhesives were prepared following Examples II, III, IV, V and IX, (respectively designated 5-9), of U.S. Pat. No. 3,968,089 to Cuscurida et al.

The components and amounts (in grams) of raw materials utilized are shown in Table I.

The intrinsic viscosities, isocyanate index and viscosity at room temperature were determined and are shown in Table II.

TABLE II

| Adhesive | Intrinsic Viscosity (I.V.) | Isocyanate Index (I.I.) | Viscosity at Room Temp (cps) |
|---|---|---|---|
| 1 | 0.11 | 1.9 | Solid |
| 2 | 0.18 | 1.6 | Solid |
| 3 | 0.15 | 1.6 | Solid |

TABLE II-continued

| Adhesive | Intrinsic Viscosity (I.V.) | Isocyanate Index (I.I.) | Viscosity at Room Temp (cps) |
|---|---|---|---|
| 4 | 0.17 | 1.6 | Solid |
| 5 | 0.09 | 12.9 | 74,000 |
| 6 | 0.09 | 12.0 | 17,440 |
| 7 | 0.07 | 16.5 | 1,960 |
| 8 | 0.09 | 21.1 | 1,520 |
| 9 | 0.09 | 13.1 | 31,000 |

TABLE I

| Adhesive | Isocyanate | Amt. | Polyols Polyester | Amt. | Polyether | Amt. | Resin or Monomers | Amt. |
|---|---|---|---|---|---|---|---|---|
| 1[A] | Methylene Bis Phenyl Diisocyanate | 84.0 | 1,6-Hexane Diol Neopentyl Glycol Adipate 2000 MW | 350.0 | — | | Ethylmethyl-acrylate Copolymer | 144.7 |
| 2[B] | Methylene Bis Phenyl Diisocyanate | 112.5 | 1,6-Hexane Diol Neopentyl Glycol Adipate 2000 MW | 101.4 | Polypropylene Glycol 1000 MW | 236.5 | Methyl/butyl Methacrylate Copolymer | 150.0 |
| 3[B] | Methylene Bis Phenyl Diisocyanate | 133.7 | 1,6-Hexane Diol Neopentyl Glycol Adipate 2000 MW | 118.2 | Polypropylene Glycol 1000 MW | 275.7 | Methyl Methacrylate Butyl Methacrylate | 63.0 111.9 |
| 4[D] | Methylene Bis Phenyl Diisocyanate | 133.7 | 1,6-Hexane Diol Neopentyl Glycol Adipate 2000 MW | 118.2 | Polypropylene Glycol 1000 MW | 275.7 | Methyl Methacrylate Butyl Methacrylate | 63.0 111.9 |
| 5 | Polymethylene Polyphenyl Polyisocyanate | 199.8 | — | | Polyethylene Polypropylene Triol 5500 MW | 200.0 | Styrene Acrylonitrile | 15.0 15.0 |
| 6 | Polymethylene Polyphenyl Polyisocyanate | 225.0 | — | | Polyethylene Polypropylene Triol 5500 MW | 225.0 | Styrene Acrylonitrile | 25.0 25.0 |
| 7 | Isophorone Diisocyanate | 450.0 | — | | Polyethylene Polypropylene Triol 5500 MW | 450.0 | Styrene Acrylonitrile | 50.0 50.0 |
| 8 | Toluene Diisocyanate | 450.0 | — | | Polyethylene Polypropylene Triol 5500 MW | 450.0 | Styrene Acrylonitrile | 50.0 50.0 |
| 9 | Polymethylene Polyphenyl Polyisocyanate | 450.0 | — | | Polyethylene Polypropylene Diol 4000 MW | 450.0 | Styrene Acrylonitrile | 50.0 50.0 |

[A] Procedure of Example XIII
[B] A repeat of Example XIII
[C] Similar to Example I
[D] Resin polymerized in prepolymer using 1.4 grams benzoyl peroxide, 3.5 grams azobisisobutyronitrile, and 1.4 grams acetyl peroxide as initiator and 0.68 grams dodecyl mercaptan as a chain transfer agent.

The following test procedures were used to determine the initial (green) strength performance of the adhesives. Results of the testing are shown in Table III.

Peel Test

Wood-grained vinyl substrate was coated with 1.0-1.5 mil thickness of adhesive heated @ approx. 120° C. (direct or transfer) and pressed together with ⅜" thickness particle board 3-5 sec in a press @ 5 lbs. The sample was peeled at 90° in a peel tester e.g. Instron Tester at rate of 5"/min. (Sample dimension=½" width strip, 3-4" length). The sample was peeled immediately from press i.e., within 1-2 minutes.

Lap Shear

Five mil. gauge aluminum was coated with 2-3 mil. thickness of adhesive heated at approx. 120° C. (direct or transfer). The coated aluminum was pressed together with ⅜" thickness particle board 3-5 sec. in a press at approx. 5 lbs. The sample was pulled at 180° in a tensile tester (e.g. Instron Tester) at rate of 0.2 inches per minute. (Sample dimension ½"×½" bond area.) The sample was pulled immediately from press i.e., within 1-2 minutes.

TABLE III

| Adhesive | Peel (lbs./in.) | Lap Shear (lbs./in.) |
|---|---|---|
| 1 | 4.2-4.4 | 31.5 |
| 2 | 4.0-4.0 | 18.2 |
| 3 | 1.0-1.1 | 9.3 |
| 4 | 1.4-1.7 | 15.1 |
| 5 | No Initial Bond | No Initial Bond |
| 6 | No Initial Bond | No Initial Bond |
| 7 | No Initial Bond | No Initial Bond |
| 8 | No Initial Bond | No Initial Bond |
| 9 | No Initial Bond | No Initial Bond |

Results similar to those achieved above would be obtained under appropriate reaction conditions using suitable polyamino or polymercapto containing components in place of the polyol of Example XIII in producing the urethane prepolymer.

The following examples illustrate the use of ethylenically unsaturated monomers containing moisture reactive functional groups.

| Ingredient | Weight (grms) |
|---|---|
| 1. Polypropylene glycol (MW: 1000) | 138.0 |
| 2. 1,6-hexanediol, neopentyl glycol adipate (MW: 2000) | 59.0 |
| 3. methylene bisphenyl diisocyanate | 67.0 |
| 4. azo bis(isobutyronitrile) | 1.0 |
| 5. methacryloxypropyl trimethoxysilane | 2.7 |
| 6. butyl methacrylate | 55.5 |
| 7. methyl methacrylate | 30.0 |
| 8. azo bis(isobutyronitrile) | 0.2 |

A one liter round bottom flask equipped with a condenser, a gas inlet tube, a slow addition funnel, a thermometer, an agitator and provisions for heating/cooling. The reaction flask was purged with dry nitrogen and a slow stream of nitrogen was bubbled subsurface throughout the reaction. Charge 1, 2 and 3 to the flask at room temperature and raise the internal temperature to 80° C. After two hours at 80° C., the mixture of 4, 5, 6 and 7 was added to the flask uniformly over a period of two hours. Then the temperature was raised to 100°-110° C., 8 was added and the reaction was held for one hour. Finally, the reaction mixture was discharged from the flask to a one pint stainless steel container.

Properties of the sample:

| | |
|---|---|
| % methacrylate polymer | 25% |
| ratio of butyl methacrylate/methyl methacrylate/methacryloxypropyl trimethoxysilane | 62.9/34.3/2.8 |
| % urethane prepolymer | 75% |
| % isocyanate group | 2.3% |
| viscosity at 120° C. | 21,000 cps |
| viscosity at room temperature | solid |
| intrinsic viscosity in tetrahydrofuran/ethanol | 0.20 dl/g |
| calculated MW of urethane prepolymer | 2,625 |

EXAMPLE XVI

| | Weight (grms) | | |
|---|---|---|---|
| Ingredient | A | B | C |
| 1. polypropylene glycol (MW: 1000) | 138.0 | 138.0 | 138.0 |
| 2. 1,6-hexanediol, neopentyl glycol adipate (MW: 2000) | 59.0 | 59.0 | 59.0 |
| 3. methylene bisphenyl diisocyanate | 67.0 | 67.0 | 67.0 |
| 4. azo bis(isobutyronitrile) | 1.5 | 1.2 | 1.2 |
| 5. methacryloxypropyl trimethoxysilane | 5.5 | 13.5 | 27.0 |
| 6. butyl methacrylate | 55.0 | 50.0 | 41.0 |
| 7. methyl methacrylate | 30.0 | 26.5 | 22.0 |
| 8. azo bis(isobutyronitrile) | 0.5 | 0.5 | 0.5 |

These samples were prepared according to the procedure described in the example XV. The properties of the samples were summarized as follows:

| | A | B | C |
|---|---|---|---|
| % methacrylate polymer | 25% | 25% | 25% |
| ratio of butyl methacrylate/methyl methacrylate/methacryloxypropyl trimethoxysilane | 61/33/6 | 50/35/10 | 46/24/30 |
| % urethane polymer | 75% | 75% | 75% |
| % isocyanate groups | 1.9% | 2.2% | 2.0% |
| Intrinsic viscosity in tetrahydrofuran/ethanol | 0.17 dl/g | 0.17 dl/g | 0.17 dl/g |
| Calculated MW of urethane prepolyer | 2,625 | 2,625 | 2,625 |

EXAMPLE XVII

This example described the synthesis of another semi-IPN hot melt adhesive such as disclosed in Example I which consisted of an urethane prepolymer and a butyl methacrylate/methyl methacrylate copolymer.

The particular hot melt adhesive described herein was then used as a "control" in evaluating the hot melt adhesive of Examples XVI and XVIII-XX which contained functional cross-linking groups.

| | Ingredient | Weight (gms) |
|---|---|---|
| 1. | polypropylene glycol (MW: 1000) | 276.0 |
| 2. | 1,6-hexanediol, neopentyl glycol adipate (MW: 2000) | 118.0 |
| 3. | methylene bisphenyl diisocyanate | 134.0 |
| 4. | azo bis(isobutyronitrile) | 1.7 |
| 5. | butyl methacrylate | 112.0 |

| | Ingredient | Weight (gms) |
|---|---|---|
| 6. | methyl methacrylate | 63.0 |
| 7. | azo bis (isobutyronitrile) | 0.6 |

The sample was prepared following the procedure of example 1. The properties of the sample were summarized as follows:

| | |
|---|---|
| % methacrylate polymer | 25% |
| ratio of butyl methacrylate/methyl methacrylate | 64/36 |
| % urethane prepolymer | 75% |
| % isocyanate groups | 2.0% |
| Viscosity at 120° C. | 20,000 cps |
| Viscosity at room temperature | solid |
| Intrinsic viscosity in tetrahydrofuran/ethanol | 0.15 dl/g |
| calculated MW of urethane prepolymer | 2,625 |

The samples produced in Examples XV-XVII where then tested using the peel strength and heat resistance tests described previously.

| | Peel Strength (lbs/inch) | | |
|---|---|---|---|
| Example | 5 mil base aluminum foil | 2 mil mylar | 6 mil vinyl |
| XV | 11.0 | 8.6 | 9.0 |
| XVIA | 9.6 | 7.5 | 10.0 |
| XVIB | 9.3 | 4.5 | 9.0 |
| XVIC | 9.5 | 9.2 | 9.8 |
| XVII | 4.5 | 3.0 | 3.0 |

| Example | Time for Adhesive to Fail at 150° C. (minutes) |
|---|---|
| XV | >180 |
| XVIA | >180 |
| XVIB | >180 |
| XVIC | >180 |
| XVII | 46 |

The fully IPN adhesives of Examples XV and XVI clearly demonstrated their superior heat resistance as compared to the semi-IPN adhesive of Example XVII.

EXAMPLE XVIII

Two samples containing vinyl triethoxy silane in the methacrylate copolymers were prepared using the procedure described in Example XV. The data are summarized as follows:

| | A | B |
|---|---|---|
| % methacrylate polymer | 25 | 25 |
| ratio % butyl methacrylate/methyl methacrylate/vinyl triethoxysilane | 61/34/5 | 59/31/10 |
| % urethane polymer | 75 | 75 |
| % isocyanate group | 1.9 | 2.0 |
| intrinsic viscosity in tetrahydrofuranl ethanol | 0.6 | 0.15 |
| calculated M.W. of urethane prepolymer | 2625 | 2625 |

These two samples also had excellent adhesive strength and heat resistance.

EXAMPLE XIX

| | Ingredient | Weight (gms) |
|---|---|---|
| 1. | polypropylene glycol (MW: 1000) | 138.0 |
| 2. | 1,6-hexanediol, neopentyl glycol | 59.0 |

-continued

| | Ingredient | Weight (gms) |
|---|---|---|
| | adipate (MW: 2000) | |
| 3. | methylene bisphenyl diisocyanate | 67.0 |
| 4. | azo bis(isobutyronitrile) | 1.0 |
| 5. | isocyanatoethyl methacrylate | 2.5 |
| 6. | butyl methacrylate | 55.5 |
| 7. | methyl methacrylate | 30.0 |
| 8. | azo bis(isobutyronitrile) | 0.2 |

A one liter round bottom flask equipped with a condenser, a gas inlet tube, a slow addition funnel, a thermometer, an agitator and provisions for heating/cooling. The reaction flask was purged with dry nitrogen and a slow stream of nitrogen was bubbled subsurface throughout the reaction. 1, 2 and 3 were charged to the flask at room temperature and the internal temperature was raised to 80° C. After two hours at 80° C., the mixture of 4, 5, 6 and 7 was added to the flask uniformly over a period of two hours. The temperature was then raised to 100°–110° C., 8 was added and the reaction was held for one hour. Finally, the reaction mixture was discharged from the flask into a one pint stainless steel container.

Properties of the sample:

| | |
|---|---|
| % methacrylate polymer | 25% |
| ratio of butyl methacrylate/methyl methacrylate/isocyanatoethyl methacrylate | 62.9/34.3/2.8 |
| % urethane prepolymer | 75% |
| isocyanate group | 2.3 |
| viscosity at 120° C. | 23,000 cps |
| viscosity at room temperature | solid |
| intrinsic viscosity in tetrahydrofuran/ethanol | 0.21 dl/g |
| calculated MW of urethane prepolymer | 2.62 |

EXAMPLE XX

| | | Weight (gms) | |
|---|---|---|---|
| Ingredient | A | B | C |
| 1. polypropylene glycol (MW: 1000) | 138.0 | 138.0 | 138.0 |
| 2. 1,6-hexanediol, neopentyl glycol adipate (MW: 2000) | 59.0 | 59.0 | 59.0 |
| 3. methylene bisphenyl diisocyanate | 67.0 | 67.0 | 67.0 |
| 4. azo bis(isobutyronitrile) | 1.5 | 1.5 | 2.0 |
| 5. isocyanatoethyl methacrylate | 13.5 | 27.0 | 46.0 |
| 6. butyl methacrylate | 49.5 | 41.0 | 29.0 |
| 7. methyl methacrylate | 27.0 | 22.0 | 16.0 |
| 8. azo bis(isobutyronitrile) | 0.5 | 0.5 | 0. |

These samples were prepared according to the procedure described in the Example XIX. The properties of the samples of Examples XIX and XX were compared with those of Example XVII and are summarized as follows:

| | A | B | C |
|---|---|---|---|
| % methacrylate polymer | 25% | 25% | 25% |
| ratio of butyl methacrylate/methyl methacrylate/isocyanato-ethyl methacrylate | 55/30/15 | 46/24/30 | 32/18/50 |
| % urethane polymer | 75% | 75% | 75% |
| % isocyanate groups | 3.2% | 4.2% | 5.3% |
| Intrinsic viscosity in tetrahydrofuran/ethanol | 0.25 dl/g | 0.26 dl/g | 0.17 dl/g |
| Calculated MW of urethane prepolymer | 2,625 | 2,625 | 2,625 |

| Peel Strength (lbs/inch) | | |
|---|---|---|
| 5 mil base | 2 mil | 6 mil |

| Sample No. | aluminum foil | mylar | vinyl |
|---|---|---|---|
| XIX | 10.0 | 7.6 | 7.6 |
| XXA | 6.8 | 4.0 | 8.0 |
| XXB | 7.2 | 4.7 | 8.5 |
| XXC | 3.0 | 1.0 | 7.6 |
| XVII | 4.5 | 3.0 | 3.0 |

| Sample No. | Time for Adhesive to Fail at 150° C. (minutes) |
|---|---|
| XIX | >180 |
| XXA | >180 |
| XXB | >180 |
| XXC | >180 |
| XVII | 46 |

The results indicated that fully IPN adhesives of Examples XIX and XX give even better adhesion than the semi-IPN adhesives of Example XVII.

EXAMPLE XXI

This example illustrates the use of a commercially available polyol (NIAX Polyol 24-32) which contains a styrene/acrylonitrile copolymer, some of which is grafted onto the polyol. The polyol/styrene/acrylonitrile material is used to produce a composition suitable for use in foamed-in-place gasketing or adhesive applications.

| | |
|---|---|
| NIAX Polyol 24-32 | 2298.3 gm |
| 1,6-hexane diol neopentyl glycol adipate 2000 MW | 985.0 gm |
| Methylene bis phenyl diisocyanate | 408.2 gm |

Procedure

The NIAX polyol 24-32, 1,6-hexane diol neopentyl glycol adipate, and methylene bis phenyl diisocyanate were added to a 5 liter flask equipped with a thermometer, stirring, condenser, and a gas inlet tube. A dry nitrogen atmosphere was maintained throughout the reaction. The contents were heated with agitation for 4 hrs @ 100° C., and poured hot from the reaction vessel. The sample had the following properties:

| Properties: | |
|---|---|
| % Styrene/acrylonitrile graft and copolymer | 12.4% |
| % Urethane prepolymer | 87.6% |
| % Isocyanate groups | 1.4% |
| Viscosity at 120° C. | 7080 cps |
| Viscosity at room temp. | semi-solid (1,420,000 cps) |
| Color | Sl. Yellow |
| Clarity | Cloudy |
| Isocyanate index | 1.7 |

The resulting composition was tested as a foamable hot melt adhesive (gasket) using a variety of foaming formulations as shown in the table below:

| | A | B | C | D |
|---|---|---|---|---|
| Adhesive of Ex. XXI | 100 | 100 | 100 | 100 |
| IPD-A130* | — | 2.0 | — | — |
| DABCO** | — | — | 0.25 | — |
| Dibutyl Tin Dilaurate | — | — | — | 0.25 |

*A ketamine derivative of isophorone diamine available from Nuodex Div. of Huls Co.
**3 - ethylene diamine available from Air Products.

In foaming the adhesives, all catalysts or coreactants were dissolved in an inert liquid, Santicizer 141 (an alkyl aryl phosphate available from Monsanto Corp.), and then added to the adhesive base which had been preheated to 120° C. Nitrogen gas was bubbled through the heated material and the mixture stirred at high agitation to produce a foamy mixture that was cast hot on release paper at 10 mils. When cooled, the material was placed in a constant temperature at 70° F. and 50% relative humidity for cure with ambient moisture.

To test, the cured materials were removed from the release carrier and a tensile test run to calculate tensile strength as a guide to the condition of cure. The results are presented below:

|   | 24 hrs. | 48 hrs. | 72 hrs. |
|---|---|---|---|
| A | uncured | 862 psi | 1241 psi |
| B | uncured | 29 psi | 14 psi |
| C | 330 psi | 1410 psi | 1246 psi |
| D | 708 psi | 645 psi | 531 psi |

The test results illustrate the benefit of the use of a catalyst in the foamed adhesive of the invention. Thus, C and D samples prepared with the catalyst showed a good degree of cure after 24 hrs., while the uncatalyzed material (A) did not cure until about 40 hrs. In addition, samples C and D showed a tendency to hold gas bubble structure longer than did sample A.

This material was foamed in a Nordson Foam Melt ™ machine as taught in U.S. Pat. No. 4,059,714 and gave a resilient foam of 50% air content possessing excellent heat resistance on curing after 40 hours. With catalyst, the cure time was below 24 hrs.

It will be apparent that various changes and modifications may be made in the embodiments of the invention described above, without departing from the scope of the invention, as defined in the appended claims, and it is intended therefore, that all matter contained in the foregoing description shall be interpreted as illustrative only and not as limitative of the invention.

We claim:

1. A solvent-free hot melt polyurethane adhesive composition which is solid at room temperature consisting essentially of:
   (a) 5 to 90% by weight of a urethane prepolymer having an isocyanate content of 0.25 to 15% and an isocyanate index greater than 1 and no more than about 2;
   (b) 10 to 95% by weight of a low molecular weight polymer of ethylenically unsaturated monomers containing no active hydrogen, the monomers being polymerized to an intrinsic viscosity of 0.1 to 0.4 as measured in a 9:1 mixture of tetrahydrofuran and alcohol; said hot melt adhesive formulation being characterized, in the absence of tackifiers or plasticizers, by a viscosity of 3000 to 50,000 cps at 120° C. (Thermocel).

2. The hot melt adhesive composition of claim 1 wherein the ethylenically unsaturated monomer is selected from the group consisting of $C_1$ to $C_{12}$ esters of acrylic and methacrylic acid, vinyl esters and ethers, fumarates, maleates, styrene, acrylonitrile, ethylene and mixtures thereof.

3. The hot melt adhesive composition of claim 1 wherein the urethane prepolymer is prepared from the condensation polymerization of a polyol and a polyisocyanate.

4. The hot melt adhesive composition of claim 1 wherein the urethane prepolymer is prepared from the condensation polymerization of a diol and a diisocyanate.

5. The hot melt adhesive composition of claim 3 wherein the polyol is selected from the group consisting of substituted or unsubstituted polyalkylene ether glycols or polyhydroxy polyalkylene ethers, polyhydroxy polyesters, the ethylene or propylene oxide adducts of polyols and the mono-substituted esters of glycerol.

6. The hot melt adhesive of claim 1 wherein the urethane prepolymer is prepared from the condensation polymerization of a polyamino compound and a polyisocyanate.

7. The hot melt adhesive of claim 6 wherein the polyamino compound is diamino polypropylene glycol or diamino polyethylene glycol.

8. The hot melt adhesive of claim 1 wherein the urethane prepolymer is prepared from the condensation polymerization of a polymercapto compound and a polyisocyanate.

9. The hot melt adhesive of claim 8 wherein the polymercapto compound is a polythioether.

10. The hot melt adhesive of claim 1 wherein the polyisocyanate is selected from the group consisting of ethylene diisocyanate, ethylidene diisocyanate, propylene diisocyanate, butylene diisocyanate, hexamethylene diisocyanate, toluene diisocyanate, cyclopentylene-1,3-diisocyanate, cyclohexylene-1,4-diisocyanate, cyclohexylene-1,2-diisocyanate, 4,4'-diphenylmethane diisocyanate, 2,2-diphenylpropane-4,4'-diisocyanate, p-phenylene diisocyanate, m-phenylene diisocyanate, xylylene diisocyanate, 1,4-naphthylene diisocyanate, 1,5-naphthylene diisocyanate, diphenyl-4,4'-diisocyanate, azobenzene-4,4'-diisocyanate, diphenylsulphone-4,4'-diisocyanate, dichlorohexamethylene diisocyanate, furfurylidene disocyanate, 1-chlorobenzene-2,4-diisocyanate, 4,4',4''-triisocyanato-triphenylmethane, 1,3,5-triisocyanato-benzene, 2,4,6-triisocyanato-toluene and 4,4'-dimethyldiphenylmethane-2,2',5,5-tetraisocyanate.

11. The hot melt adhesive of claim 1 wherein the free isocyanate content is 0.25 to 4%.

12. The hot-melt adhesive of claim 11 wherein the free isocyanate content is less than 1%.

13. A solvent-free hot melt adhesive polyurethane composition which is solid at room temperature consisting essentially of an isocyanate terminated polyurethane prepolymer containing polymerized therein a low molecular weight polymer of an ethylenically unsaturated monomer wherein the isocyanate terminated polyurethane prepolymer has an isocyanate content of from 0.25 to 15% and an isocyanate index greater than 1 and no more than about 2; said adhesive prepared by the steps of:
   (1) combining 2 to 90% by weight of an ethylenically unsaturated monomer containing no active hydrogen and 10 to 98% by weight of a polyol;
   (2) polymerizing the mixture of (1) by free radical polymerization with chain transfer agents to achieve a low molecular weight polymer having an intrinsic viscosity of 0.1 to 0.4 as measured in a 9:1 mixture of tetrahydrofuran and alcohol;
   (3) adding thereto sufficient polyisocyanate to yield the desired isocyanate content and isocyanate index and polymerizing by condensation polymerization.

14. The hot melt adhesive composition of claim 13 wherein the ethylenically unsaturated monomer is selected from the group consisting of $C_1$ to $C_{12}$ esters of acrylic and methacrylic acid, vinyl esters and ethers, fumarates, maleates, styrene, acrylonitrile, ethylene and mixtures thereof.

15. The hot melt adhesive composition of claim 12 wherein the urethane prepolymer is prepared from the condensation polymerization of a diol and a diisocyanate.

16. The hot melt adhesive composition of claim 13 wherein the polyol is selected from the group consisting of substituted or unsubstituted polyalkylene ether glycols or polyhydroxy polyalkylene ethers, polyhydroxy polyesters, the ethylene or propylene oxide adducts of polyols and the mono-substituted esters of glycerol.

17. The hot melt adhesives of claim 13 wherein the polyisocyanate is selected from the group consisting of ethylene diisocyanate, ethylidene diisocyanate, propylene diisocyanate, butylene diisocyanate, hexamethylene diisocyanate, toluene diisocyanate, cyclopentylene-1,3-diisocyanate, cyclohexylene-1,4-diisocyanate, cyclohexylene-1,2-diisocyanate, 4,4'-diphenylmethane diisocyanate, 2,2-diphenylpropane-4,4'-diisocyanate, p-phenylene diisocyanate, m-phenylene diisocyanate, xylylene diisocyanate, 1,4-naphthylene diisocyanate, 1,5-naphthylene diisocyanate, diphenyl-4,4'-diisocyanate, azobenzene-4,4'-diisocyanate, diphenylsulphone-4,4'-diisocyanate, dichlorohexamethylene diisocyanate, furfurylidene diisocyanate, 1-chlorobenzene-2,4-diisocyanate, 4,4',4''-triisocyanato-triphenylmethane, 1,3,5-triisocyanato-benzene, 2,4,6-triisocyanato-toluene and 4,4'-dimethyldiphenylmethane-2,2',5,5-tetraisocyanate.

18. The hot melt adhesive of claim 13 wherein the free isocyanate content is 0.25 to 4%.

19. The hot-melt adhesive of claim 18 wherein the free isocyanate content is less than 1%.

20. A solvent-free hot melt polyurethane adhesive composition which is solid at room temperature consisting essentially of:
 (a) 5 to 90% by weight of a urethane prepolymer and having an isocyanate content of 0.25 to 15% and an isocyanate index greater than 1 and no more than about 2;
 (b) 10 to 95% by weight of a low molecular weight polymer of ethylenically unsaturated monomers containing at least one moisture reactive functional group but no active hydrogen, the monomers being polymerized to an intrinsic viscosity of 0.1 to 0.4 as measured in a 9:1 mixture of tetrahydrofuran and alcohol; said hot melt adhesive formulation being characterized, in the absence of tackifiers or plasticizers, by a viscosity of 3000 to 50,000 cps. at 120° C. (Thermocel).

21. The hot melt adhesive composition of claim 20 wherein the ethylenically unsaturated monomer contains at least one silane group as the moisture reactive group.

22. The hot melt adhesive composition of claim 21 wherein the silane containing ethylenically unsaturated monomer is selected from the group consisting of vinyltrichlorosilane, vinyltriethoxysilane, vinyltrimethoxysilane, vinyltris(2-methoxyethoxy) silane, 3-methacryloxypropyltrimethoxysilane, 3-methacryloxypropyltris(2-methoxyethoxy)silane, vinyltriacetoxysilane, 4-(3-trimethoxysilylpropyl)benzylstyrene sulfonate, 3-acryloxypropyl-trimethoxysilane, allyltriethoxysilane, allyltrimethoxysilane, vinylmethyldiethoxysilane, vinyldimethylethoxysilane, vinylmethyldiacetoxysilane, 3-methyacryloxypropylmethyldiethoxysilane, and 3-acryloxypropyldimethylmethoxysilane.

23. The hot melt adhesive composition of claim 20 wherein the ethylenically unsaturated monomer contains at least one isocyanate group as the moisture reactive group.

24. The hot melt adhesive composition of claim 23 wherein the isocyanate containing ethylenically unsaturated monomer is isocyanoatoethyl methacrylate or m-isopropenyl-α,α-dimethylbenzyl isocyanate.

25. A process for the production of a solvent-free hot melt polyurethane adhesive composition which is solid at room temperature characterized, in the absence of added tackifiers or plasticizers, by a viscosity of 3000 to 50,000 cps. at 120° C. (Thermocel), comprising the steps of:
 (1) combining 2 to 90% by weight of an ethylenically unsaturated monomer containing no active hydrogen and 10 to 98% by weight of a polyol;
 (2) polymerizing the mixture of (1) by free radical polymerization with chain transfer agents to achieve a low molecular weight polymer having an intrinsic viscosity of 0.1 to 0.4 as measured in a 9:1 mixture of tetrahydrofuran and alcohol;
 (3) adding thereto sufficient polyisocyanate to yield an isocyanate content of 0.25 to 15% and an isocyanate index greater than 1 and less than about 2 and polymerizing by condensation polymerization.

26. A process for the production of a solvent-free hot melt polyurethane adhesive composition which is solid at room temperature characterized, in the absence of added tackifiers or plasticizers, by a viscosity of 3000 to 50,000 cps. at 120° C., comprising the step of polymerizing, to a low molecular weight by free radical polymerization to an intrinsic viscosity of 0.1 to 0.4 as measured in a 9:1 mixture of tetrahydrofuran and alcohol in a urethane prepolymer having an isocyanate content of 0.25 to 15% and an isocyanate index greater than 1 and no more than about 2, at least one ethylenically unsaturated monomer containing no active hydrogen; in a ratio such that the final product contains 5 to 90% by weight of the urethane prepolymer and 0 to 95% by weight of the low molecular weight polymer.

27. A process for the production of a solvent-free hot melt polyurethane adhesive composition which is solid at room temperature characterized, in the absence of added tackifiers or plasticizers, by a viscosity of 3000 to 50,000 cps. at 120° C. (Thermocel), comprising the steps of:
 (1) dissolving a low molecular weight polymer of ethylenically unsaturated monomers containing no active hydrogen and having an intrinsic viscosity of 0.1 to 0.4 as measured in a 9:1 mixture of tetrahydrofuran and alcohol in the non-isocyanate urethane prepolymer component and
 (2) forming the urethane prepolymer by reacting the mixture of (1) with a polyisocyanate in an amount sufficient to provide an isocyanate index greater than 1 and no more than about 2 and in a ratio such that the final product contains 5 to 90% by weight of the urethane prepolymer and 0 to 95% by weight of the low molecular weight polymer.

28. A process for the production of a solvent-free hot melt polyurethane adhesive composition which is solid at room temperature characterized, in the absence of added tackifiers or plasticizers, by a viscosity of 3000 to 50,000 cps. at 120° C. (Thermocel), comprising the step of dissolving a low molecular weight polymer of ethylenically unsaturated monomers containing no active hydrogen in a urethane prepolymer and having an intrinsic viscosity of 0.1 to 0.4 as measured in a 9:1 mixture of tetrahydrofuran and alcohol, having an isocyanate content of 0.25 to 15% and an isocyanate index greater than 1 and no more than about 2; in a ratio such that the final product contains 5 to 90% by weight of the urethane prepolymer and 0 to 95% by weight of the low molecular weight polymer.

* * * * *